A. H. WELKER.
TRACTION ENGINE.
APPLICATION FILED JAN. 19, 1911.
1,063,307.
Patented June 3, 1913.
2 SHEETS—SHEET 1.
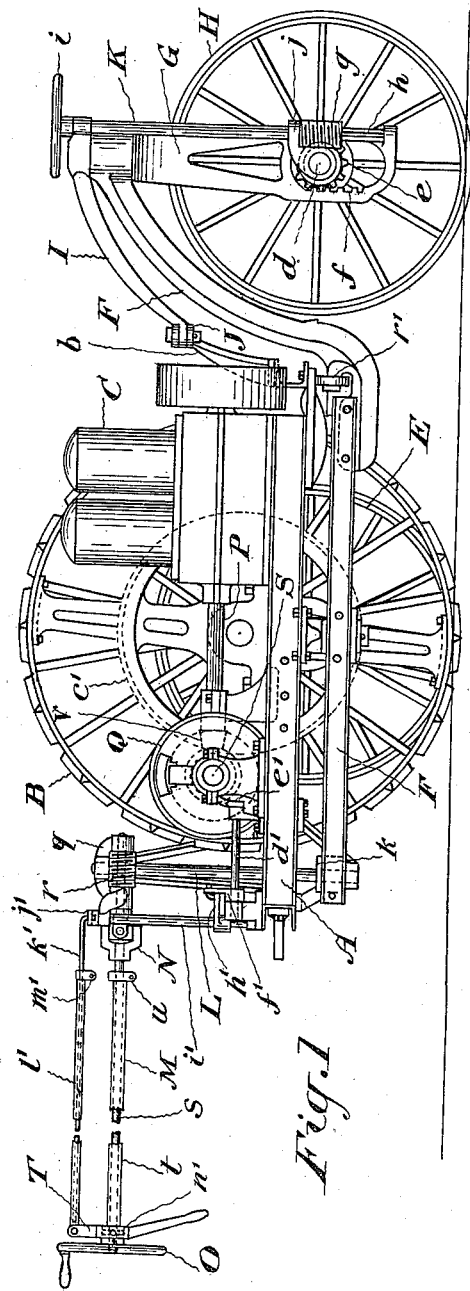
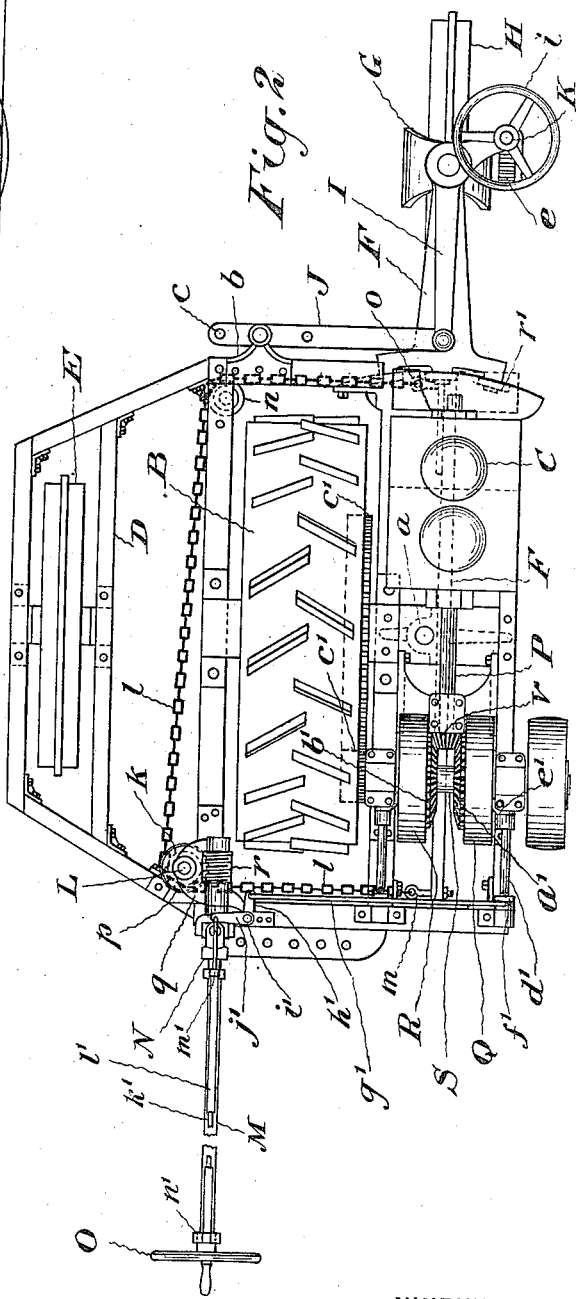
WITNESSES:
INVENTOR.
A. H. Welker
BY Ridout & Maybee
J. Edw. Maybee
ATTORNEY.

A. H. WELKER.
TRACTION ENGINE.
APPLICATION FILED JAN. 19, 1911.

1,063,307.

Patented June 3, 1913.
2 SHEETS—SHEET 2.

WITNESSES:
W. G. McMillan
E. J. Hall.

INVENTOR.
A. H. Welker
BY Ridout & Maybee
J. Edw. Maybee
ATTORNEY.

UNITED STATES PATENT OFFICE.

ALEXANDER H. WELKER, OF BERLIN, ONTARIO, CANADA.

TRACTION-ENGINE.

1,063,307. Specification of Letters Patent. Patented June 3, 1913.

Application filed January 19, 1911. Serial No. 603,520.

*To all whom it may concern:*

Be it known that I, ALEXANDER H. WELKER, of the town of Berlin, in the Province of Ontario, Canada, have invented certain new and useful Improvements in Traction-Engines, of which the following is a specification.

The object of my invention is to devise a comparatively low priced traction engine which may, when used for plowing, harvesting and the like, be controlled in its movements from the apparatus it is drawing so that one man only is necessary for the complete control of a plowing or harvesting outfit.

I attain my object by means of a construction which may be briefly described as follows: The engine is provided with three wheels only, a single driving wheel, a laterally offset balance wheel and a steering wheel in front preferably offset laterally toward the opposite side of the driver from the balance wheel. The steering wheel is journaled on a fork journaled in a frame pivoted on the main frame in line with the axle of the driver. The steering is accomplished by swinging the steering wheel frame, and the relative movement of the main and steering wheel frames is utilized to also turn the steering wheel relative to its frame, thus obtaining great steering effect with but small relative movement of the steering gear. The steering gear may be of any suitable construction but is controlled by a telescopic universal jointed steering spindle which is extended back convenient to the seat of the operator of the implement being drawn. An internal combustion motor is employed and this actuates the driving wheel through the medium of a reversing gear, which gear is controlled by means of a lever and connecting rod carried by the steering spindle.

Figure 3:
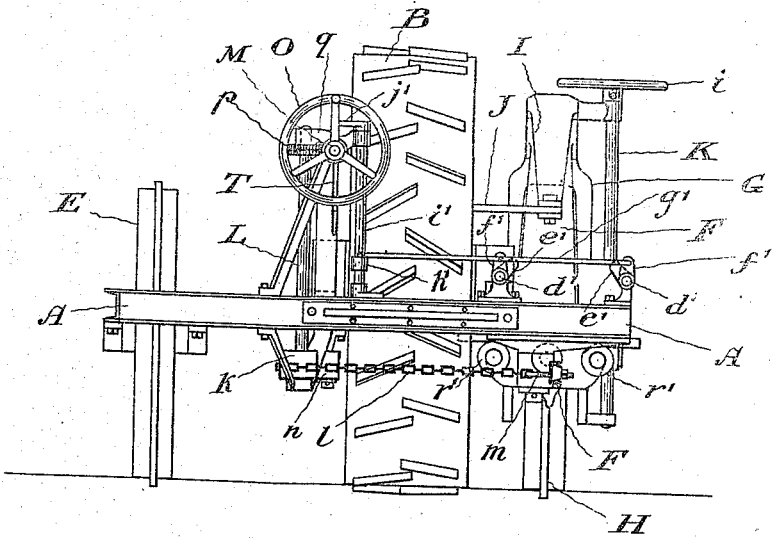
Figure 4:
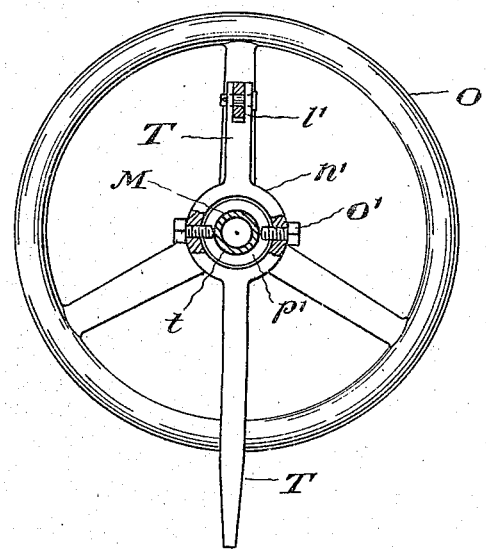

Figure 1 is a side elevation of a traction engine constructed in accordance with my invention. Fig. 2 is a plan view of the same. Fig. 3 is an end elevation of the same. Fig. 4 is a detail of the connection between the controlling lever and the transmission gear and the steering rod.

In the drawings like letters of reference indicate corresponding parts in the different figures.

A is the main frame of the engine. Centrally journaled in this frame is the driving wheel B. At one side of the driving wheel the frame forms a platform to carry the motor C while at the other side is formed a platform D to carry the water cooling ignition device and other accessories usually demanded by an internal combustion motor.

At one side of and preferably having its axis in the same vertical plane as the axis of the drive wheel is a balance ground wheel E suitably journaled on the main frame A.

F is a steering wheel frame which is pivotally connected with the main frame at *a*. This pivot is preferably located in the same vertical plane as the axis of the driving wheel B. The steering wheel frame F has a fork G journaled at its forward end in which fork is journaled the steering wheel H in a manner hereinafter described.

To the upper end of the fork G is secured the arm I. To the other end of this arm is pivotally connected one end of the link J. The other end of this link is pivotally connected with the bracket *b* secured to the forward side of the main frame. One or more holes *c* are provided in the link for purposes of adjustment.

The steering of the engine is performed by turning the steering wheel frame F relative to the main frame A. This, of course, turns the steering wheel at an angle to the axis of the driving wheel. A still further turning movement of the steering wheel is effected through the operation of the link J and arm I so that any given angular movement of the two frames relative to one another produces a very much greater angular movement of the steering wheel and as the steering wheel and main drive wheel are close together as compared with ordinary forms of traction engine the engine will turn in a very small circle which enables it to operate close up to the boundaries of the field in which it is being used.

Particularly for plowing it is desirable that the steering wheel be vertically adjustable. For purposes of adjustment I therefore journal on the journal *d* on the steering wheel a pinion *e* which pinion engages a rack *f* formed on the fork G. This pinion is also engaged by a worm *g* slidable on a feather key *h* on the adjusting spindle K that is vertically journaled on the fork and provided at its upper end with the hand wheel *i*. A bracket *j* is provided in which both the journal *d* and the spindle K are journaled, and this bracket serves to limit the upward movement of the worm *g*. It is evident that by turning the spindle K that the pinion e may be rotated to move the journal d up or down thus providing the desired vertical adjustment of the steering wheel H.

A lateral adjustment of the steering wheel is obtained by swinging the main frame A and the steering wheel frame F relative to one another and by subsequently adjusting the link J to bring the steering wheel again into parallelism with the drive wheel.

The steering mechanism comprises a steering post L vertically journaled on the main frame. This steering post carries a wheel $k$ having an operative engagement with the chain $l$ which is in effect two chains one end being led to the point $m$ where it is connected with the rear end of the steering wheel frame F and the other led around a guide roller $n$ and connected at $o$ to the forward part of the steering wheel frame.

To the upper end of the steering post L is connected a worm wheel $p$.

M is a rearwardly extending steering rod which is preferably telescopic and is provided with a universal joint. The forward end of the steering rod is suitably journaled in the bracket $q$ which is connected with the main frame and in which is also journaled the upper end of the steering post L. On the steering rod is secured the worm $r$ meshing with the worm wheel $p$.

N is the universal joint in the steering rod which is of any ordinary construction. The steering rod is made telescopic by forming it in two parts, an inner rod $s$ and an outer sleeve $t$, which may be clamped in any desired position on the rod $s$ by means of the clamp $u$.

To the outer end of the sleeve $t$ is secured the hand wheel O by means of which the steering rod is rotated. This arrangement of the steering rod enables the engine to be steered from the driver's seat of the plow, harvester, binder or other implement being drawn by the traction engine, so that one man is enabled to control both the implement and the engine.

As an internal combustion motor is employed with this engine reversing transmission gearing must be employed, and this also must be controllable from the implement being drawn by the engine. This transmission gearing and the controlling mechanism therefor is arranged as follows: P is the crank shaft of the motor. On this crank shaft is secured the bevel pinion $v$ meshing with the bevel gears $a'$ $b'$ connected respectively with the clutches Q and R on the counter shaft S. This counter shaft by means of the spur gearing $c'$ actuates the driving wheel B.

The clutches Q and R may be of any ordinary construction, but are preferably of the friction type. By means of these clutches either of the gears $a'$ $b'$ may be given a driving connection with the counter shaft and the counter shaft thus driven either forward or backward or allowed to remain stationary. These clutches are actuated through the medium of the following mechanism:

Two rock shafts $d'$ are journaled on the main frame and each rock shaft is provided with an arm $e'$ which will be connected with one of the clutches to actuate the same. Each rock shaft $d'$ has an arm $f'$ secured thereto (see particularly Fig. 3) and these arms are pivotally connected with a coupling bar $g'$. The other end of this coupling bar is pivotally connected with an arm $h'$ secured to a vertical rock shaft $i'$ suitably journaled on the main frame. The upper end of this rock shaft is provided with an arm $j'$ extending into close proximity to the universal joint N. By rocking the arm $j'$ it is evident that the rock shaft $d'$ may be operated to throw the clutches Q and R into and out of gear. To control this transmission gear shifting mechanism I provide a telescopic connecting rod comprising an inner rod $k'$ having a loose pivotal connection with the arm $h'$ and a sleeve $l'$ which may be clamped in a desired position on the rod $k'$ by means of the clamp $m'$. The sleeve $l'$ is pivotally connected with one arm of a lever T which has a yoke $n'$ formed thereon embracing the sleeve $t$ of the steering rod M.

Pivots or trunnions $o'$ are formed on this yoke $n'$ engaging a groove $p'$ formed in a collar on the sleeve $t$. The lever T is thus given a fulcrum on the steering rod which is not interfered with by the rotation of the latter. By actuating this lever the operator on the driver's seat of the implement being drawn may throw either clutch of the transmission gear into or out of clutch and thus have entire control of the transmission gear.

On reference particularly to Figs. 1 and 2 it will be seen that friction rollers $r'$ are provided to form a bearing between the forward parts of the main frame and the steering wheel frame to reduce friction when the two move relative to one another.

From the above description it will be seen that I have devised an engine particularly adapted for the use of smaller farmers in the West and the engine will be comparatively low priced and in its operation the use of one man is dispensed with.

What I claim as my invention is:—

1. In a traction engine the combination of a frame; a single driving wheel; a laterally offset balance wheel; a forwardly extending steering wheel frame pivoted on the main frame; a steering wheel carried by said steering wheel frame; means for swinging the steering wheel frame relative to the main frame comprising chains led to and connected to the steering wheel frame in front of and behind its pivot; a steering post adapted to operate said chains; a worm wheel on said post; a steering rod and a worm on said rod engaging the worm wheel.

2. In a driving engine the combination of a frame; a single driving wheel; a laterally offset balance wheel; a forwardly extending steering wheel frame pivoted on the main frame; a steering wheel carried by said steering wheel frame; means for swinging the steering wheel frame relative to the main frame comprising chains led to and connected to the steering wheel frame in front of and behind its pivot; a steering post adapted to operate said chains; a worm wheel on said post; a telescopic rod provided with a universal joint; and a worm on said rod engaging the worm wheel.

Signed in the presence of two witnesses this 28th day of December, 1910.

ALEXANDER H. WELKER.

Witnesses:
J. J. A. WEIR,
ARTHUR B. POLLOCK.

Copies of this patent may be obtained for five cents each, by addressing the "Commissioner of Patents, Washington, D. C."